United States Patent [19]

Gillett et al.

[11] Patent Number: 4,759,904

[45] Date of Patent: Jul. 26, 1988

[54] PRESSURIZED WATER REACTOR HAVING IMPROVED CALANDRIA ASSEMBLY

[75] Inventors: James E. Gillett, Hempfield Township, Westmoreland County; John E. Goossen, Penn Township, Westmoreland County, both of Pa.

[73] Assignee: Westinghouse Electric Corp., Pittsburgh, Pa.

[21] Appl. No.: 848,178

[22] Filed: Apr. 4, 1986

[51] Int. Cl.[4] .................. G21C 1/08; G21C 15/00
[52] U.S. Cl. .................... 376/353; 376/377; 376/399
[58] Field of Search ............ 376/353, 377, 389, 399, 376/352

[56] References Cited

U.S. PATENT DOCUMENTS

| 3,371,016 | 2/1968 | Tower et al. | 376/377 X |
| 3,816,245 | 6/1974 | Bevilacqua | 376/353 X |
| 3,849,257 | 11/1974 | Bevilacqua | 376/353 X |
| 4,092,216 | 5/1978 | Aubert | 376/353 |

FOREIGN PATENT DOCUMENTS

204793  11/1984  Japan ........................... 376/353

Primary Examiner—John F. Terapane
Assistant Examiner—John S. Maples
Attorney, Agent, or Firm—D. C. Abeles

[57] ABSTRACT

A calandria assembly is received within the pressure vessel of a nuclear reactor system, at an elevation corresponding to the level of the outlet nozzles of the vessel, and receives pressurized coolant traveling in an axial flow direction within the vessel and turns same to a radial direction for exit through the outlet nozzles. Hollow tubes mounted in parallel relationship at opposite ends to first and second plates of the calandria in conjunction with a cylindrical skirt of cylindrical configuration joining the first and second plates of the calandria, present a redundant structure introducing the potential of thermal stresses, which are limited by selection of the pattern of flow holes in the lower plate and the provision of flexible annular weld joints of J-shaped configuration between the lower ends of the calandria tubes and the lower, second calandria plate.

14 Claims, 6 Drawing Sheets

PRESSURIZED WATER REACTOR HAVING IMPROVED CALANDRIA ASSEMBLY

BACKGROUND OF THE INVENTION

1. Field of the Invention

This invention relates to the pressure vessel of a pressurized water reactor system of an advanced design and, more particularly, to an improved calandria assembly within the pressure vessel which provides requisite mechanical support functions, taking into account acceptable stress conditions and vibration problems to which the calandria assembly is subjected, while affording enhanced flow conditions.

2. State of the Relevant Art

As is well known in the art, conventional pressurized water reactors employ a number of control rods which are mounted within the reactor vessel, generally in parallel axial relationship, for axial translational movement in telescoping relationship with the fuel rod assemblies. The control rods contain materials which absorb neutrons and thereby lower the neutron flux level within the core. Adjusting the positions of the control rods relative to the respectively associated fuel rod assemblies thereby controls and regulates the reactivity and correspondingly the power output level of the reactor. Typically, the control rods, or rodlets, are arranged in clusters, and the rods of each cluster are mounted to a common, respectively associated spider. Each spider, in turn, is connected to a respectively associated adjustment mechanism for raising or lowering the associated rod cluster.

In certain advanced designs of such pressurized water reactors, there are employed both control rod clusters (RCC) and water displacer rod clusters (WDRC), and also so-called gray rod clusters which, to the extent here relevant, are structurally identical to the RCC's and therefore both are referred to collectively hereinafter as RCC's. In one such reactor design, a total of over 2800 reactor control rods and water displacer rods are arranged in 185 clusters, each of the rod clusters having a respectively corresponding spider to which the rods of the cluster are individually mounted.

In the exemplary such advanced design pressurized water reactor, there are provided, at successsively higher, axially aligned elevations within the reactor vessel, a lower barrel assembly, an inner barrel assembly, and a calandria, each of generally cylindrical configuration, and an upper closure dome. The lower barrel assembly has mounted therein, in parallel axial relationship, a plurality of fuel rod assemblies comprising the reactor core, and which are supported at the lower and upper ends thereof, respectively, by corresponding lower and upper core plates, the latter being welded to the bottom edges of the cylindrical sidewall of the inner barrel assembly. Within the inner barrel assembly there are mounted a large number of rod guides disposed in closely spaced relationship, in an array extending substantially throughout the cross-sectional area of the inner barrel assembly. The rod guides are of first and second types, respectively housing therewithin reactor control rod clusters (RCC) and water displacer rod clusters (WDRC); these clusters, as received in telescoping relationship within their respectively associated guides, generally are aligned with respectively associated fuel rod assemblies.

One of the main objectives of the advanced design, pressurized water reactors to which the present invention is directed, is to achieve a significant improvement in the fuel utilization efficiency, resulting in lower, overall fuel costs. Consistent with this objective, the water displacement rodlet clusters (WDRC's) function as a mechanical moderator control, all of the WDRC's being fully inserted into association with the fuel rod assemblies, and thus into the reactor core, when initiating a new fuel cycle. Typically, a fuel cycle is of approximately 18 months, following which the fuel must be replaced. As the excess reactivity level diminishes over the cycle, the WDRC's are progressively, in groups, withdrawn from the core so as to enable the reactor to maintain the same reactivity level, even though the reactivity level of the fuel rod assemblies is reducing due to dissipation over time. Conversely, the control rod clusters are moved, again in axial translation and thus telescoping relationship relatively to the respectively associated fuel rod assemblies, for control of the reactivity and correspondingly the power output level of the reactor on a continuing basis, for example in response to load demands, in a manner analogous to conventional reactor control operations. The WDRC's provide a mechanical means for spectral shift control of a reactor and a reactor incorporating same is disclosed in the copending application Ser. No. 946,112, filed Dec. 24, 1986 a continuation of application Ser. No. 217,503, filed Dec. 16, 1980 and entitled MECHANICAL SPECTERAL SHIFT REACTOR and applications cited therein; a system and method for achieving the adjustment of both the RCC's and WDRC's are disclosed in the copending application of Altman et al., Ser. No. 806,719, filed Sept. 12, 1985, and entitled "DISPLACER ROD DRIVE MECHANISM VENT SYSTEM." Each of the foregoing applications is assigned to the common assignee hereof and is incorporated herein by reference.

A critical design criterion of such advanced design reactors is to minimize vibration of the reactor internals structures, as may be induced by the core outlet flow as it passes therethrough. A significant factor for achieving that criterion is to maintain the core outlet flow in an axial direction throughout the inner barrel assembly of the pressure vessel and thus in parallel axial relationship relative to the rod clusters and associated rod guides. The significance of maintaining the axial flow condition is to minimize the exposure of the rod clusters to crossflow, a particularly important objective due to the large number of rods and the type of material required for the WDRC's which creates a significant wear potential. This is accomplished by increasing the vessel length sufficiently so as to locate the rods below the vessel outlet nozzles, whereby the rods are subjected only to axial flow. The calandria then is provided as an additional structure, disposed above the inner barrel assembly and thus above the level of the rods. The calandria receives the axial core outlet flow, and turns the flow through 90° to a radial direction for exiting from the radially oriented outlet nozzles of the vessel. The calandria thus must withstand the crossflow generated as the coolant turns from the axial to the radial directions, and must provide for shielding and flow distribution in the upper internals of the vessel. Advanced design pressurized water reactors of the type here considered incorporating such calandria structures are disclosed in the copending application Ser. No. 490,101 to James E. Kimbrell et al., for "NUCLEAR REACTOR"; application Ser. No. 490,059 to Luciano C. Veronesi for "CALANDRIA"; and application Ser. No. 490,099, "NUCLEAR REACTOR" all thereof concurrently filed on Apr. 29, 1983 and incorporated herein by reference. Additionally, structural elements known as formers are included within the vessel to assist in maintaining the desired axial flow condition within the inner barrel, assembly; modular such formers are disclosed in the copending application Ser. No. 798,195, filed Nov. 14, 1985, and entitled "MODULAR FORMER FOR INNER BARREL ASSEMBLY OF PRESSURIZED WATER REACTOR," having a common coinventor herewith and assigned to the common assignee hereof.

In general, the calandria includes a lower calandria plate and an upper calandria plate. The rod guides are secured in position at the lower and upper ends thereof, respectively, to the upper core plate and the lower calandria plate. Within the calandria and extending between aligned apertures in the lower and upper plates thereof is mounted a plurality of calandria tubes in parallel axial relationship, respectively aligned with the rod guides. A number of flow holes are provided in the lower calandria plates, at positions displaced from the apertures associated with the calandria tubes, through which the reactor core outlet flow passes as it exits from its upward passage through the inner barrel assembly. The core outlet flow or a major portion thereof, as received in the calandria, turns from the axial flow direction to a radial direction for passage through radially outwardly oriented outlet nozzles which are in fluid communication with the calandria.

In similar parallel axial and aligned relationship, the calandria tubes are joined to corresponding flow shrouds which extend to a predetermined elevation within the dome, and which in turn are in alignment with and in close proximity to corresponding head extensions which pass through the structural wall of the dome and carry, on their free ends at the exterior of and vertically above the dome, corresponding adjustment mechanisms, as above noted. The adjustment mechanisms have corresponding drive rods which extend through the respective head extensions, flow shrouds, and calandria tubes and are connected to the respectively associated spiders to which the clusters of RCC rods and WDRC rods are mounted, and serve to adjust their elevational positions within the inner barrel assembly and, correspondingly, the level to which the rods are lowered into the lower barrel assembly and thus into association with the fuel rod assemblies therein, thereby to control the reactivity within the core.

The calandria, as before noted, performs the important function of shielding the drive rods and performing flow distribution in the upper internals. Since the radial flow, or crossflow, velocities are the range of 40 feet per second, it must be robust and able to withstand the vibrational loading imposed thereon by such crossflow. Further, the vessel provides a flow path for the coolant to enter the head region directly, for cooling the adjustment mechanisms mounted on the head assembly and vessel dome, and a downcomer flow path through which the head coolant normally passes from the head region to mix with the core outlet flow and exit from the vessel through the outlet nozzles. The head region also serves as a reservoir of low temperature coolant which passes through the downcomer flow path and ultimately into the lower internals, to cool the core in the event of a LOCA (loss of coolant accident). The calandria thus is an interface between the high temperature core outlet flow and the low temperature coolant of the head region, and accordingly is subjected to the significant temperature differential which exists therebetween, and must be flexible in order to limit the magnitude of the resulting thermal stresses.

Conventional reactor internals have no structural analogy to the calandria assembly of such advanced design reactors, and thus there are no known solutions for satisfying the requirements of such a calandria assembly as above set forth and to which the present invention relates.

SUMMARY OF THE INVENTION

As before noted, a pressurized water nuclear reactor incorporating a calandria assembly, and particularly the improved calandria assembly of the present invention, employs a large number of control rods, or rodlets, typically arranged in what are termed reactor control rod clusters (RCC) and, additionally, a large number of water displacer rods, or rodlets, similarly arranged in water displacer rod clusters (WDRC), an array of 185 such clusters containing a total of 2800 rodlets (i.e., the total of reactor control rods and water displacer rods) being mounted in respective, corresponding rod guides and in parallel axial relationship within the inner barrel assembly of the reactor vessel. More specifically, the rods of each cluster are mounted at their upper ends to a corresponding spider, and the spider-mounted cluster is received in telescoping relationship within the corresponding rod guide. The spider is connected through a drive rod to a corresponding adjustment mechanism disposed on the exterior of the head assembly of the vessel, which provides for selectively raising or lowering the rod cluster relatively to an associated group of fuel rod assemblies, to control the reactivity, and thus the power output level of the reactor, as before described.

The basic calandria structure comprises an annular, flanged cylinder, the flange of which is received on a supporting ledge of the vessel and the lower end of the cylinder being connected to the periphery of a main structural support plate, termed the upper calandria plate, of corresponding, generally circular configuration. A connecting cylinder is connected at its upper end to the periphery of, and depends from, the main structural support plate and is connected at its lower end to the perimeter of a generally circular, lower calandria plate which is much thinner than the upper calandria plate. Hollow tubes of generally circular cross-section, termed calandria tubes, extend in a parallel axial direction between the upper and lower calandria plates and are aligned with corresponding holes provided therefor in those plates. As before noted, the drive rods for the rod clusters are received through the calandria tubes and are shielded thereby from the crossflow within the calandria.

The present invention provides for welded connections between the calandria tubes and the upper and lower calandria plates, which eliminate the potential of loosening, due to flow induced vibration, of mechanical connections which potentially could be employed for this purpose, and afford the further advantage of requiring less space than a mechanical connection requires. The resulting construction is quite stiff, consistent with the support requirements of the calandria, but introduces the potential of being susceptible to developing significant thermal stresses due to the differences in the material structure and geometry, and particularly the redundant structure between the lower and upper calandria plates, as presented by the calandria tubes and the connecting cylinder, or skirt, in view of the temperatures to which they are subjected. Further, whereas the upper calandria plate is relatively massive and stable, temperature differentials or gradients to which it is subjected may cause it to bend; the connecting cylinder, or skirt, is likewise very stiff, but is much thinner than the upper calandria plate and therefor exhibits a different thermal response. Thus, there is a critical requirement to relieve or limit the levels of thermal stress which can develop in the calandria assembly.

In accordance with the present invention, the potentially significant thermal stresses are limited and relieved by controlling the stiffness of the lower calandria plate, in the axial direction, achieved in accordance with the proper selection of plate thickness and flow hole pattern therein, and the provision of flexible weld joints between the plate and the calandria tubes. Specifically, the lower calandria plate is selected to be of a thickness of approximately 1.5 inches and the flow hole pattern comprises a substantially symmetrical distribution of flow holes about each of the mounting holes associated with the calandria tubes; further, flexible welds are formed between the calandria tubes and the lower calandria plate, achieved in the embodiment disclosed herein by counterbored annular weld interfaces of a "J-shaped" configuration. These combined features afford the requisite stiffness for affording the requisite structural support and withstanding vibration, while relieving thermal stresses.

As before noted, flow shrouds are provided in the head assembly to protect the drive lines, or drive rods, from direct exposure to the head coolant flow which, if it contacted the drive rods directly, could cause unacceptable levels of drive rod vibration due to the long, unsupported lengths of the drive rods. The flow shrouds, however, if implemented as simple cylinders surrounding the drive rods, would preclude the blowdown flow of a large portion of the coolant in the head assembly, as is relied upon for cooling the core in the event of a LOCA. Particularly, the coolant flow path from the head region to the core during blowdown is through the inside annuli intermediate the outer diameter of the drive rods and the inner diameter of the corresponding calandria tubes. Thus, once the head region drains to the tops of the flow shrouds, the remaining coolant is trapped within the head above the upper calandria plate and can no longer pass through the flow shrouds/calandria tube annuli and drain into the core.

To solve this problem, the present invention introduces flow holes at the base of the flow shrouds and above the top surface of the upper calandria plate, and a flow diverter which is disposed coaxially within each flow shroud and in surrounding, shielding relationship with respect to the drive rod at the vicinity of the flow holes. The flow holes thus permit drainage of the complete head cooling region during blowdown, while the flow diverter protects the drive rod from exposure to jetting of the head coolant flow in its passage through the flow holes, the latter presenting an undesirable condition which can result in increased drive rod lateral motion and corresponding wear. The flow diverter, moreover, incorporates a flow restrictor on its interior portion contiguous the drive rod therein and disposed above the flow holes, to prevent flashing of steam from blocking the flow of coolant through the flow holes during blowdown. Such blockage potentially can occur when the liquid level within the head reaches the top of the flow shroud during blowdown, if the flow path from the top of the flow shrouds to the flow holes is not restricted. The flow restrictor more particularly provides sufficient flow resistance, such that the head coolant will continue to enter the flow holes at the base of the flow shroud without being choked by steam entering the top of the flow shroud. Accordingly, the calandria and the associated shrouds and flowhole/diverter structures afford complete shielding of the drive rods from the reactor cooant crossflow throughout the entire extent of the drive rods from the head region to the top of the rod guides, without impairment of and, indeed, while assuring the requisite head coolant flow to the core during blowdown.

These and other advantages of the present invention will become more apparent from the following detailed description, taken with reference to the enclosed Figures, in which like reference numerals and letters refer to like parts throughout.

DETAILED DESCRIPTION OF THE PREFERRED EMBODIMENTS

Figure 1A:
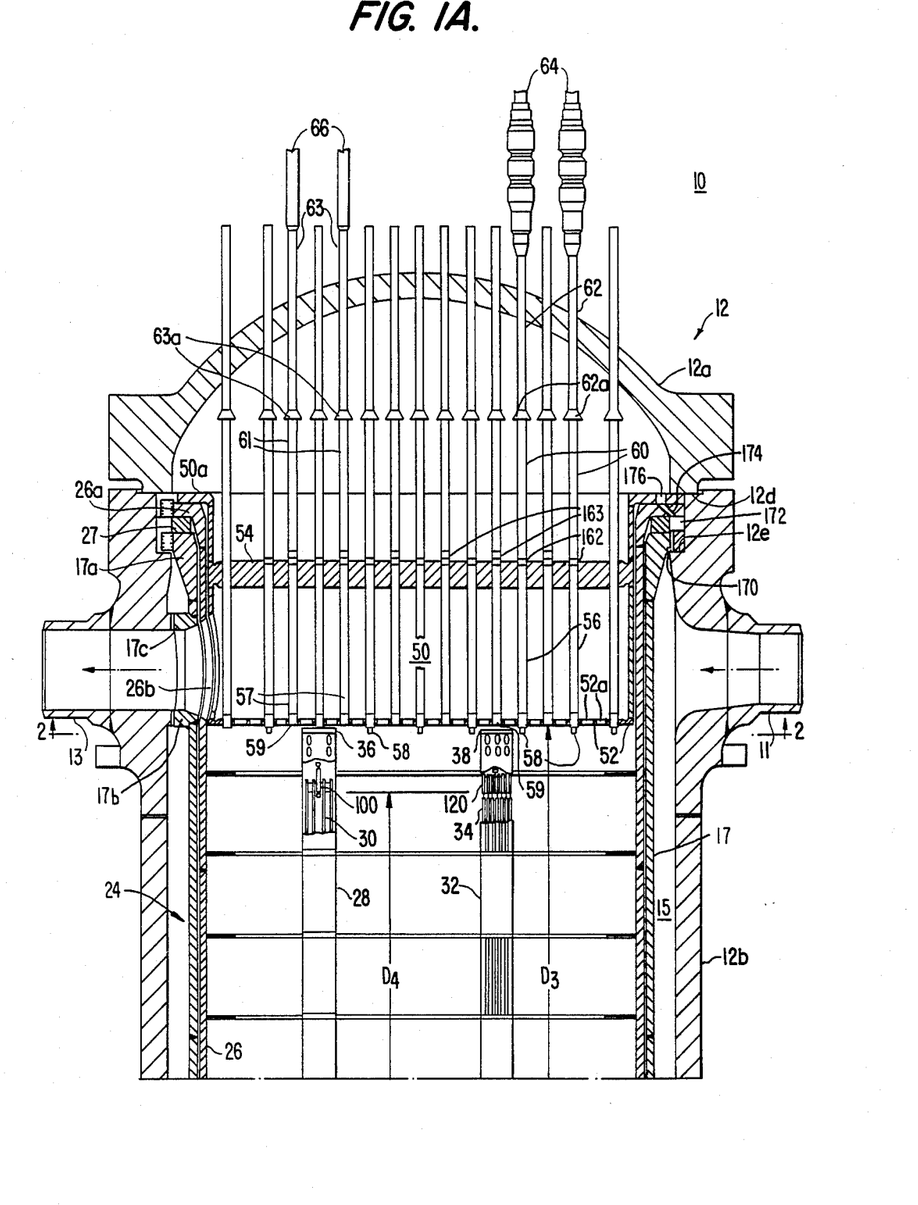
FIGS. 1A and 1B, in the composite, comprise an elevational view, partially in cross-section, of a pressurized water reactor of an advanced design incorporating an improved calandria assembly in accordance with the present invention.
Figure 1B:
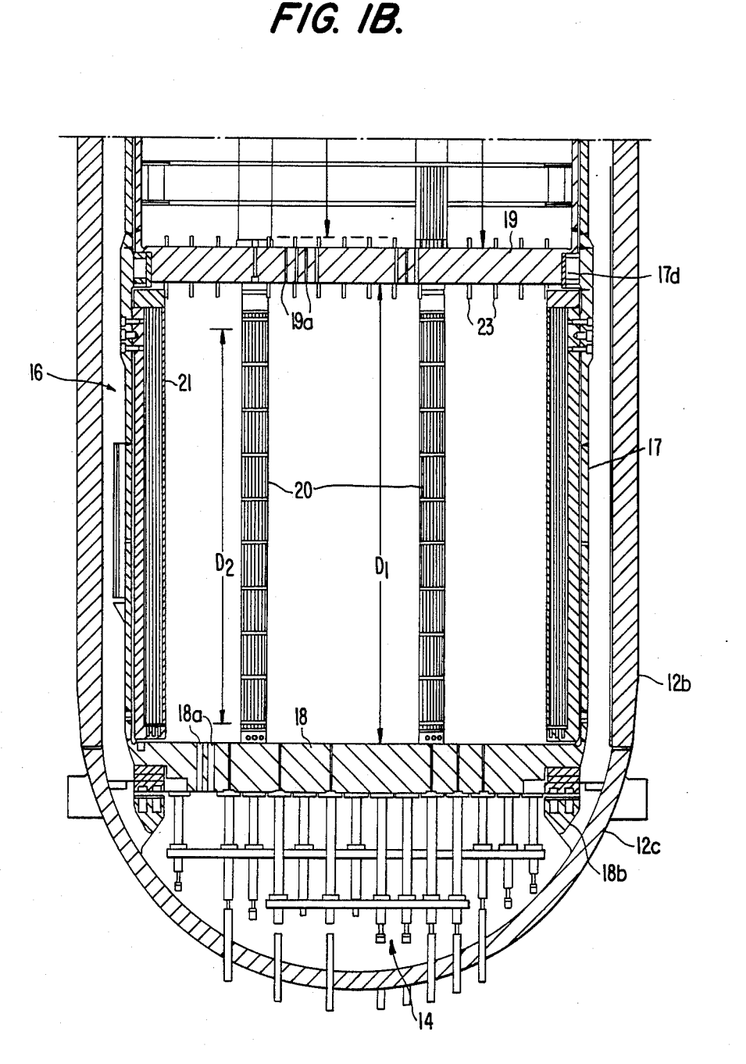

The composite of FIGS. 1A and 1B is an elevational view, partly in cross-section, of a pressurized water reactor 10 comprising a pressure vessel 12 including an upper dome, or head assembly, 12a, cylindrical sidewalls 12b and a bottom closure 12c comprising the base of the reactor 10. Plural radially oriented inlet nozzles 11 and outlet nozzles 13 (only one (1) of each appearing in FIGS. 1A and 1B) are formed in the sidewall 12b, adjacent the upper, annular end surface 12d of the sidewall 12b. Whereas the cylindrical sidewall 12b may be integrally joined, as by welding, to the bottom closure 12c, the head assembly 12a is removably received on the upper, annular end surface 12d of the sidewall 12b and secured thereto. The sidewall 12b further defines an inner, generally annular mounting ledge 12e for supporting various internals structures as later described. Within the bottom closure 12c, as schematically indicated, is so-called bottom-mounted instrumentation 14.

The lower barrel assembly 16 comprises a generally cylindrical sidewall 17 affixed at its lower end to a lower core plate 18, which is received on mounting support 18b, as generally schematically illustrated. The cylindrical sidewall 17 extends substantially throughout the axial height of the vessel 12 and includes an annular mounting ring 17a at the upper end thereof which is received on the annular mounting ledge 12e thereby to support the assembly 16 within the vessel 12. As will be rendered more apparent hereafter, the sidewall 17 is solid in the vicinity of the inlet nozzles 11, but includes an aperture 17b having a nozzle ring 17c mounted therein which is aligned with and closely adjacent to the outlet nozzle 13. An upper core plate 19 is supported on a mounting support 17d affixed to the interior surface of the cylindrical sidewall 17 at a position approximately one-half the axial height thereof. Fuel rod assemblies 20 are positioned in generally vertically oriented, parallel axial relationship within the lower barrel assembly 16 by bottom mounts 22 carried by the lower core plate 18 and by pin-like mounts 23 carried by, and extending through, the upper core plate 19. Flow holes 18a and 19a (only two of which are shown in each instance) are provided in predetermined patterns, extending substantially throughout the areas of the lower and upper core plates 18 and 19, the flow holes 18a permitting passage of a reactor coolant fluid into the lower barrel assembly 16 in heat exchange relationship with the fuel rod assemblies 20 defining the reactor core, and the flow holes 19a permittinig passage of the core output flow into the inner barrel assembly 24. A neutron reflector and shield 21 is mounted interiorly of the cylindrical sidewalls 17, in conventional fashion.

The inner barrel assembly 24 includes a cylindrical sidewall 26 which is integrally joined at its lower edge to the upper core plate 19. The sidewall 26 has secured to its upper, open end, an annular mounting ring 26a which is received on an annular hold-down spring 27 and supported along with the mounting ring 17a on the mounting ledge 12e. The sidewall 26 further includes an aperture 26b aligned with the aperture 17b and the output nozzle 13. Within the inner barrel assembly 24, and densely packed within the cylindrial sidewall 26, are positioned a plurality of rod guides in closely spaced, parallel axial relationship; for simplicity of illustration, only two such rod guides are shown in FIGS. 1A and 1B namely rod guide 28 housing a cluster of radiation control rods 30 (RCC) and a rod guide 32 housing a cluster of water displacement rods 34 (WDRC). The rods of each RCC cluster 30 and of each WDRC cluster 34 are mounted individually to the respectively corresponding spiders 100 and 120. Mounting means 36 and 37 are provided at the respective upper and lower ends of the rod guide 28 and, correspondingly, mounting means 38 and 39 are provided at the respective upper and lower ends of the rod guide 32, the lower end mounting means 37 and 39 mounting the respective rod guides 28 and 32 to the upper core plate 19, and the upper mounting means 36 and 38 mounting the respective rod guides 28 and 32 to a calandria assembly 50, and particularly to a lower calandria plate 52.

The calandria assembly 50, disclosed in greater detail in FIG. 3 and subsequently discussed in relation thereto, includes, in addition to the lower calandria plate 52, an upper calandria plate 54 which is the main support plate of the calandria assembly 50, and is joined to an annular flange 50a which is received on the flange 26a to support the calandria assembly 50 on the mounting ledge 12e. A plurality of parallel axial calandria tubes 56 and 57 are positioned in alignment with corresponding apertures in the lower and upper calandria plates 52 and 54, to which the calandria tubes 56 and 57 are mounted at their respective, opposite ends. More specifically, calandria extensions 58 and 59 extend through corresponding apertures in and are secured to the lower calandria plate 52, and the corresponding calandria tubes 56 and 57 are respectively secured to the extensions 58 and 59. Similarly, the upper ends of the calandria tubes 56 and 57 are connected to the upper calandria plate 54. The specific configuration of the connections of the calandria tubes 56 and 57 are significant to the present invention and are discussed with reference to FIGS. 3 and 4–7.

For the specific configurations of the respective calandria extensions 58 and 59 as illustrated, only the calandria extensions 58 project downwardly from the lower calandria plate 52 and connect to corresponding mounting means 36 for the upper ends, or tops, of the RCC rod guides 28. The upper end mounting means 38, associated with the WDRC rod guides 32, may be interconnected by flexible linkages to the mounting means 36 of the RCC rod guides 28, in accordance with the invention of the U.S. Pat. No. 4,687,628 entitled: "FLEXIBLE ROD GUIDE SUPPORT STRUCTURE FOR INNER BARREL ASSEMBLY OF PRESSURIZED WATER REACTOR"—Gillett et al., assigned to the common assignee hereof. Alternatively, the WDRC rod guides 32 may be connected independently to the lower calandria plate 52 by the top end support structure of the invention disclosed in the copending application, entitled: "TOP END SUPPORT FOR WATER DISPLACEMENT ROD GUIDES OF PRESSURIZED WATER REACTOR"—Gillett et al., Ser. No. 798,194, filed Nov. 14, 1985, and allowed July 22, 1987 assigned to the common assignee hereof; in the latter instance, the calandria extensions 59 likewise project downwardly from the plate 52, similarly to the extensions 58, to engage and laterally support the WDRC mounting means 38.

Extending upwardly beyond the upper calandria plate 54 and, more particularly, within the head assembly 12a of the vessel 12, there are provided plural flow shrouds 60 and 61 respectively aligned with and connected to the plural calandria tubes 56 and 57. A corresponding plurality of head extensions 62 and 63 is aligned with the plurality of flow shrouds 60, 61, the respective lower ends 62a and 63a being flared, or bell-shaped, so as to facilitate assembly procedures and, particularly, to guide the drive rods (not shown in FIG. 1) into the head extensions 62, 63 as the head assembly 12a is lowered onto the mating annular end surface 12d of the vessel sidewall 12b. The flared ends 62a, 63a also receive therein the corresponding upper ends 60a, 61a of the flow shrouds 60, 61 in the completed assembly, as seen in FIG. 1. The head extensions 62, 63 pass through the upper wall portion of the head assembly 12a and are sealed thereto. Control rod cluster (RCC) displacement mechanisms 64 and water displacement rod cluster (WDRC) displacement mechanisms 66 are associated with the respective head extensions 62, 63 flow shrouds 60, 61 and calandria tubes 56, 57 which, in turn, are associated with respective clusters of radiation control rods 30 and water displacement rods 34. The RCC displacement mechanisms (CRDM's) 64 may be of well known type, as are and have been employed with conventional reactor vessels. The displacer mechanisms (DRDM's) 66 for the water displacer rod clusters (WDRC's) 34 may be in accordance with the disclosure of U.S. Pat. No. 4,439,054—Veronesi, assigned to the common assignee hereof.

The respective drive rods associated with the CRDM's 64 and the DRDM's 66 are structurally and functionally the equivalent of an elongated, rigid rod extending from and in association with the respective CRDM's 64 and DRDM's 66 to the respective clusters of radiation control rods (RCC's) and water displacements rods (WDRC's) 30 and 34 and particularly, are connected at their lower ends to the spiders 100 and 120. The CRDM's and DRDM's 64 and 66 thus function through the corresponding drive rods to control the respective vertical positions of, and particularly, selectively to lower and/or raise, the RCC's 30 and the WDRC's 34 through corresponding openings (not shown) provided therefore in the upper core plate 19, telescopingly into or out of surrounding relationship with the respectively associated fuel rod assemblies 20.

In this regard, the interior height $D_1$ of the lower barrel assembly 16 is approximately 178 inches, and the active length $D_2$ of the fuel rod assemblies 20 is approximately 153 inches. The interior, axial height $D_3$ is approximately 176 inches, and the extent of travel, $D_4$, of the rod clusters 30 and 34 is approximately 149 inches. It follows that the extent of travel of the corresponding CRDM and DRDM drive rods is likewise approximately 149 inches.

While the particular control function is not relevant to the present invention, insofar as the specific control over the reaction within the core is effected by the selective positioning of the respective rod clusters 30 and 34, it is believed that those skilled in the art will appreciate that moderation or control of the reaction is accomplished in accordance with the extent to which the control rod clusters 30 are inserted into or withdrawn from the core and with the effective water displacement which is achieved by selective positioning of the water displacement rod clusters 34. The RCC's 30 are adjusted in position relatively frequently, compared to the WDRC's 34, to achieve the desired power output level from the reactor. Conversely, the WDRC's 34, initially, are lowered, or inserted, fully into the lower barrel assembly 16 at the initiation of each fuel cycle. The WDRC's 32, through their respective drive rods (not shown in FIG. 1) and DRDM's 66, then are selectively removed as the excess reactivity is depleted, over the fuel cycle. Typically, this is performed by simultaneously removing a group of four such WDRC's 34 from their fully inserted positions in association with the fuel rod assemblies 20, to a fully raised position within the corresponding WDRC guides 32 and thus within the inner barrel assembly 24, in a continuous and controlled withdrawal operation. More specifically, the four WDRC's 34 of a given group are selected so as to maintain a symmetrical power balance within the reactor core, when the group is withdrawn. Typically, all of the WDRC's 34 remain fully inserted in the fuel rod assemblies 20 for approximately 60% to 70% of the approximately 18 month fuel cycle. Groups thereof then are selectively and successively moved to the fully withdrawn position as the excess reactivity is depleted, so as to maintain a nominal, required level of reactivity which can sustain the desired output power level, under control of the variably adjustable RCC's 30.

The reactor coolant fluid, or water, flow through the vessel 10 proceeds generally from a plurality of inlet nozzles 11, one of which is seen in FIG. 1, downwardly through the annular chamber 15 is between an outer generally cylindrical surface defined by the interior surface of the cylindrical sidewall 12b of the vessel 12 and an inner generally cylindrical surface defined by the cylindrical sidewall 17 of the lower barrel assembly 16. The flow then reverses direction and thereafter passes axially upwardly through flow holes 18a in the lower core plate 18 and into the lower barrel assembly 16, from which it exits through a plurality of flow holes 19a in the upper core plate 19 to pass into the inner barrel assembly 24, continuing in parallel axial flow therethrough and finally exiting upwardly through flow holes 52a in the lower calandria plate 52. Thus, parallel axial flow conditions are maintained through both the lower and inner barrel assemblies 16 and 24. Within the calandria 50, the flow in general turns through 90° to exit radially from a plurality of outlet nozzles 13 (one of which is shown in FIG. 1). The inlet coolant flow also proceeds into the interior region of the head assembly 12a through perimeter bypass passageways in the mounting flanges received on the ledge 12e. Particularly, a plurality of holes 170, angularly spaced and at a common radius, are formed in the flange 17a and provide axially-directed flowpaths from the annular chamber 15 into the annular space 172 intermediate the spring 27 and the interior of the sidewalls of the vessel 12; further, a plurality of aligned holes 174 and 176 extend through the flanges 26a and 50a, the holes 174 being angularly oriented, to complete the flow paths from the annular space 172 to the interior of the head assembly 12a. The flow of coolant proceeds from the head region through annular downcomer flow paths defined interiorly of certain of the flow shrouds 60, 61 and calandria tubes 56, 57, as later described, from which the head coolant flow exits into the top region of the inner barrel assembly 24, just below the lower calandria plate 52, to mix with the core outlet flow and pass through the calandria 50, exiting from the outlet nozzles 13.

The head coolant flow maintains the head assembly 12a at a significantly reduced temperature, relative to the rest of the vessel 12, as is required for the equipment mounted thereon, such as the CRDM's 64. As later discussed, the head region also serves as a coolant reservoir, from which the coolant may flow rapidly through downcomer flow paths, in a so-called blowdown operation, to cool the nuclear core of fuel rod assemblies 20, in the event of a LOCA.

The pressure of the cycle water, or reactor coolant, within the head region typically is in the range of about 2,250 psi, and provides the energy source, i.e., fluid pressure, to the DRDM's 66 for raising the DRDM drive rods from a fully inserted to a fully withdrawn, or up position, as described more fully in the related, above-identified patent. In this regard, the core outlet flow is at a relatively reduced pressure, due to pressure drops imposed by the passage of the coolant through the lower and upper barrel assemblies 16 and 20 and especially the fuel assemblies 20.

Figure 2:
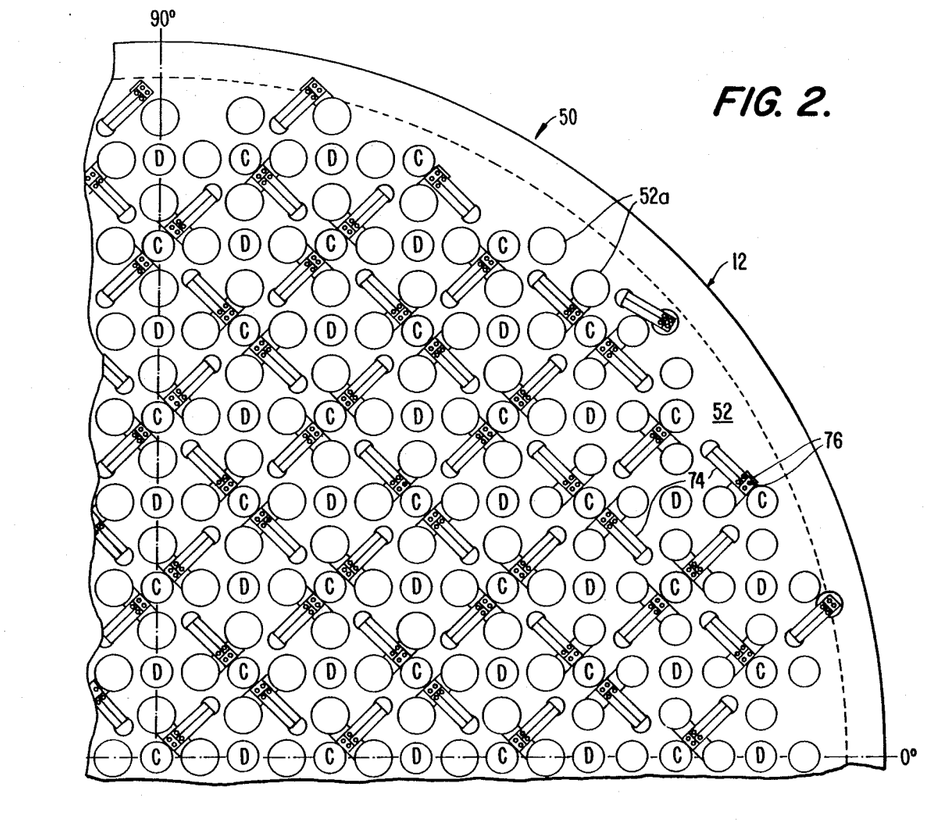
FIG. 2 is a simplified, or schematic, plan view, taken along the line 2—2 in FIG. 1, of a fragmentary portion of the improved calandria assembly.

FIG. 2 is a cross-sectional, schematic bottom planar view of the lower calandria plate 52 at a position in FIGS. 1A and 1B intermediate the mounting means 36 and 38 for the RCC and WDRC rod guides 28 and 32, respectively, and the plate 52; further, FIG. 2 is on an enlarged scale, and represents only a fragmentary quadrant of the internal structure of the calandria 50 for illustrating diagramatically the dense packing of the arrays of plural control and water displacer rod clusters 30 and 34 within the inner barrel assembly 24. Each of the circles labelled "D" designates an aperture, or hole, in the calandria plate 52 through which is received a corresponding DRDM drive rod, associated with a corresponding WDRC cluster 34; similarly, each of the circles marked "C" designates an aperture in the calandria plate 52 through which is received a corresponding CRDM drive rod, associated with a corresponding RCC cluster 30. These apertures C and D, along with the corresponding RCC and WDRC calandria tubes 56 and 57, and the corresponding shrouds 60 and 61 define downcomer flow paths, relative to the drive rods received therethrough. Further, the circles 52a in the lower calandria plate 52 in FIG. 2 correspond to the apertures 52a shown in FIG. 1, which provide for passage of the reactor coolant output flow from the inner barrel assembly 24 into the calandria assembly 50.

Elements 74 comprise leaf springs which are mounted by bolts 76 to the calandria lower plate 52 in oppositely oriented pairs, generally in alignment with the diameters of the RCC associated apertures "C," in an alternating, orthogonally related pattern. The free ends of the springs 74 bear downwardly upon the upper surfaces of the RCC mounting means 36 of a next-adjacent aperture "C," so as to provide a frictional force opposing lateral displacement thereof and accordingly of the associated rod guide 28, while affording a degree of flexibility to the axial position of the rod guide. While the use of springs 74 is one preferred structural mounting means for the RCC guides, in accordance with the disclosure of the above noted, U.S. Pat. No. 4,687,628 entitled: "FLEXIBLE ROD GUIDE SUPPORT STRUCTURE FOR INNER BARREL ASSEMBLY OF PRESSURIZED WATER REACTOR," alternative mounting means may be employed for this purpose and thus the foregoing described structure is not to be deemed limiting in any sense, but merely illustrative.

As will be apparent by comparison of FIGS. 1 and 2, the RCC clusters and WDRC clusters are disposed in densely packed, interleaved arrays, substantially across the entire cross-sectional area of the inner barrel assembly 24. The RCC and WDRC rod clusters 30 and 34 are supported by corresponding spiders 100 and 120, as illustratively shown in FIG. 1, in turn connected through corresponding drive rods to the CRDM's 64 and DRDM's 66, as hereafter described.

Figure 3:
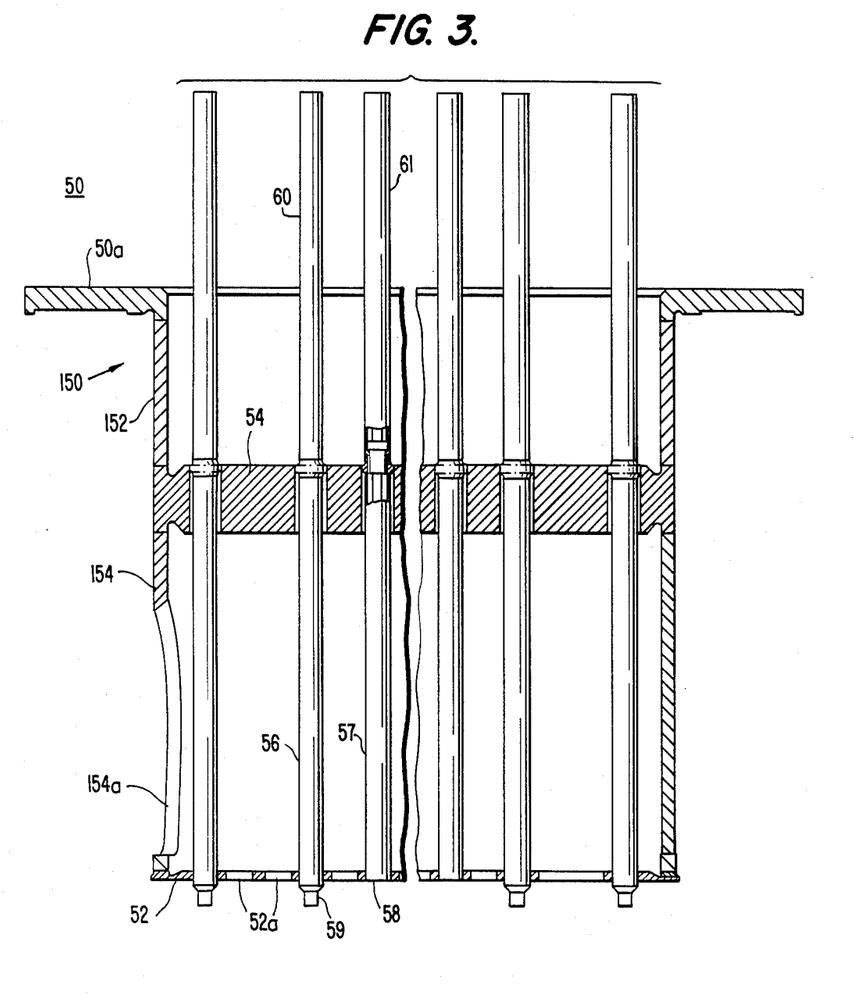
FIG. 3 is an elevational view, partially in cross-section, of a fragmentary portion of the calandria assembly, on an enlarged scale relative to that of FIG. 1, for illustrating more clearly the structure of the components of the calandria assembly.

FIG. 3 is an enlarged, elevational and cross-sectional, fragmentary view of the calandria 50, as removed from the vessel 12 and including the shrouds 60, 61 associated with the calandria tubes 56, 57, respectively. The connections of the lower ends of the calandria tubes 56 and 57 through the extensions 58, 59 to the lower calandria plate 52 are shown in greater details in FIGS. 4 and 5, respectively; the connections of the upper ends of the calandria tubes 56 and 57, and of the lower ends of the respectively associated shrouds 60 and 61, to the upper calandria plate 54 are shown in greater detail in FIGS. 6 and 7. Each of FIGS. 4 through 7 is in vertical cross-section as in FIG. 3, and on a greatly enlarged scale relatively thereto. Concurrent reference will be had in the following to FIGS. 3 through 7.

The calandria assembly 50, as now seen more clearly in FIG. 3, comprises a generally cylindrical, flanged shell 150 formed of a composite of the flange 50a, an upper connecting cylinder 152 which is welded at its upper and lower edges to the flange 50a and to the upper calandria plate 54, respectively, and a lower connecting cylinder, or skirt, 154 which is welded at its upper and lower edges to the upper and lower calandria plates 54 and 52, respectively. The lower connecting cylinder, or skirt, 154 includes an opening 154a aligned with each of the outlet nozzles 13 such that the axial core outlet flow received within the calandria 52 through the openings 52a in the lower calandria plate 52 may turn through 90° and exit radially from within the calandria 52 through the opening 154a to the outlet nozzle 13.

Figure 4:
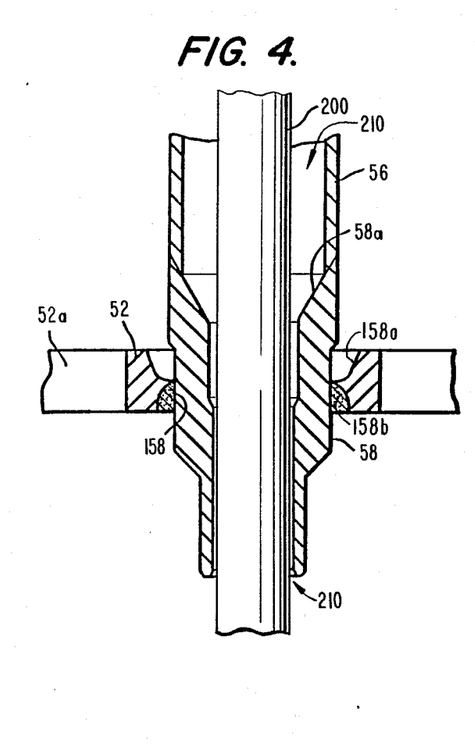
FIGS. 4, 5, 6 and 7 are elevational and cross-sectional fragmentary views of portions of the structure of FIG. 3, illustrating specific connections of the calandria tubes to the upper and lower calandria plates.
Figure 5:
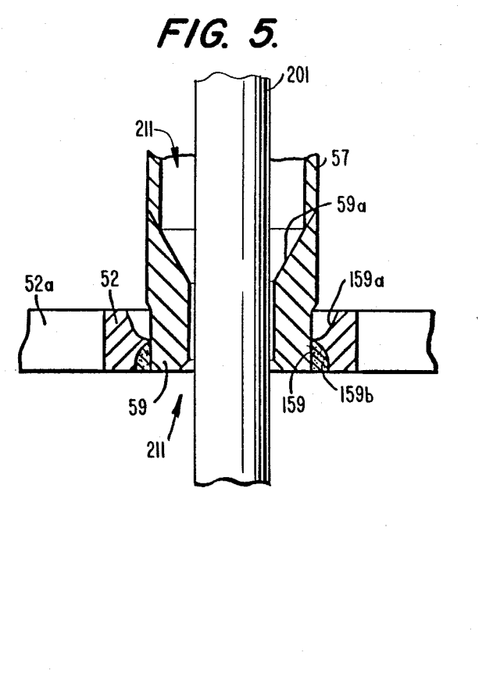

As best seen in FIGS. 4 and 5, the extensions 58 and 59 for the calandria tubes 56 and 57 are received through corresponding mounting holes 158 and 159 in the lower calandria plate 52, and which are counter-bored so as to define "J-shaped" cross-sectional annuli 158a and 159a surrounding the circumferences of the corresponding extensions 58 and 59. Full penetration welds 158b and 159b then are formed in the interfaces of the J-shaped annuli 158a and 159a and the contiguous circumferential surfaces of the respective extensions 58 and 59, respectively, affording flexible annular weld joints therebetween. The respective calandria tubes 56 and 57 are then butt welded at their lower ends to the inclined, upper end surfaces 58a and 59a of the respective extensions 58 and 59. The extensions 58 and 59 in conjunction with the annuli 158a and 159a and the flexible annular weld joints 158b and 159b thus afford a flexible connecting means between the lower ends of the calandria tubes 56 and 57 and the lower calandria plate 52.

As before noted, the extensions 59 associated with the WDRC drive rods 201 and the WDRC rod guides 38, rather then being flush with the lower surface of the lower calandria plate 52, instead may be elongated and project axially downwardly, similarly to the extensions 58 associated with the RCC rod guides 36, to engage independent mounting means 38 for the WDRC rod guides 32, where the latter are not flexibly linked to the mounting means 36 for the RCC rod guides 28, all in accordance with the disclosures of the above identified copending applications.

Figure 6:
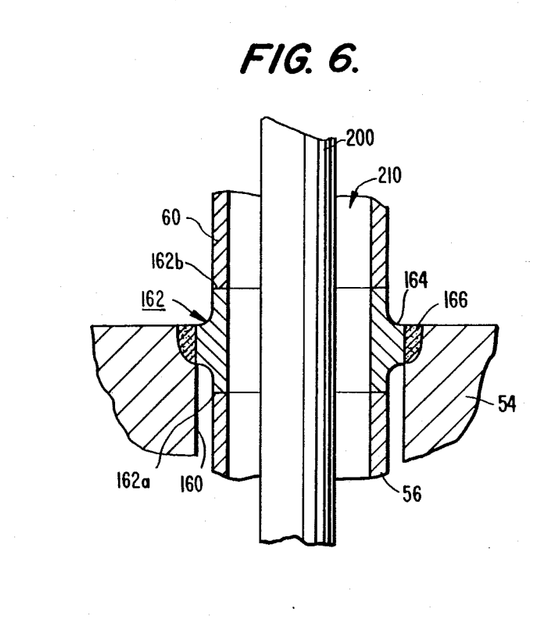
Figure 7:
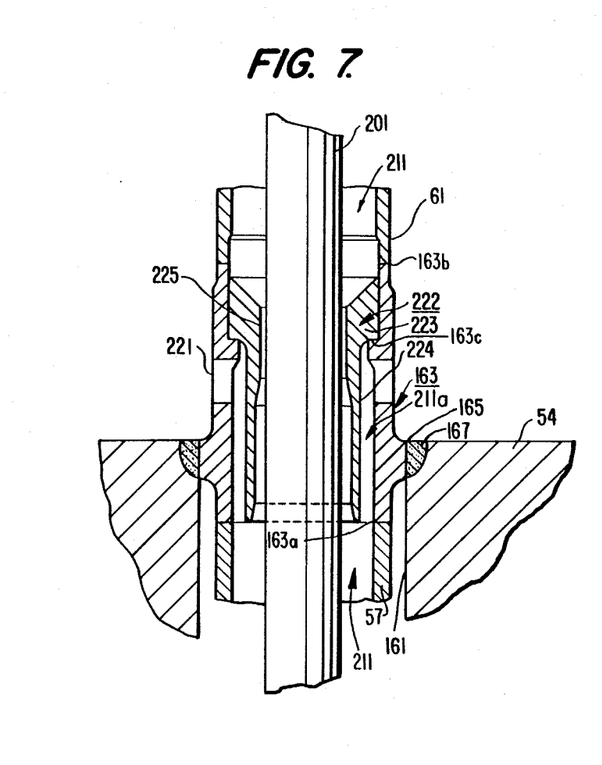

The means for connecting the calandria tubes 56 and 57 with the upper calandria plate 54 are illustrated in FIGS. 6 and 7, respectively, to which reference is now had. Mounting holes 160 and 161 are formed through the upper calandria plate 54, within which are received respective connectors 162 and 163 which are butt welded at their lower ends 162a, 163a to the upper ends of the corresponding calandria tubes 56, 57, and at their upper ends 162b, 163b, to the lower ends of the corresponding shrouds 60, 61. The connectors 162, 163 have respective annular mounting collars 164, 165, which are radially enlarged so as to be juxtaposed in contiguous relationship with the sidewalls of the holes 160, 161 adjacent the upper surface of the upper calandria plates 54, and corresponding full penetration welds 166, 167 are formed therebetween.

As seen from FIGS. 4 and 6, and FIGS. 5 and 7, respectively, RCC drive rod 200 and WDRC drive rod 201 are received through the respective calandria tubes 56 and 57, the corresponding extensions 58 and 59, the connectors 162 and 163, and the shrouds 160 and 161 respectively, for interconnecting the corresponding RCC and WDRC drive mechanisms 64 and 66 with the respective spiders 100 and 120 and the corresponding, associated RCC rod clusters 30 and WDRC rod clusters 34.

From FIG. 3, it will be particularly clear that the calandria assembly 50 is a redundant structure, in that the spacing of the upper and lower calandria plates 54 and 52 is defined by both the connecting cylinder, or skirt, 154 and the calandria tubes 56, 57, all of which are connected at their respective upper and lower ends to the calandria plates 52 and 54, as hereinbefore described and specifically illustrated and discussed with reference to FIGS. 3 through 7. The rigidity of the structure is necessary to afford adequate structural stability and to withstand flow induced vibration forces thereby to prevent excessive wear of internal components and, particularly, the drive rods 200 and 201 and the attached rod clusters 30 and 34. However, due to thermal transients and steady state differentials produced by the core outlet flow relative to the low temperature coolant in the head assembly 12a, significant thermal stresses may develop within the calandria assembly 50, which may cause some degree of bending or distortion of the main support, upper calandria plate 54. Due to the respectively different configurations of an temperature distributions on the plates 52 and 54, the connecting cylinder, or skirt, 154 and the calandria tubes 56, 57, and the tendency of the plate 54 to be distorted, significant axial thermal stresses potentially could develop.

The present invention affords a structure which minimizes those thermal stresses and limits same to an acceptable level. Particularly, the lower calandria plate 52 is of approximately 1.50" in thickness and is provided with a generally symmetrical pattern of flow holes 52a disposed about each of the mounting holes 158 and 159, as before described; as a result, the lower calandria plate 52 is relatively flexible, especially in comparison to the upper calandria plate 54. Moreover, the J-shaped annuli 158a and 159a provide adequate integrity of the welded joints 158b and 159b and lateral rigidity, or stiffness, yet afford axial flexibility. These combined factors thus compensate for the axially-directed thermal stresses and associated bending stresses which otherwise would develop.

Within the head assembly 12a, the flow shrouds 60, 61 protect the drive rods 200, 201 from the head coolant flow which, if the drive rods 200, 201 were directly subjected thereto, could produce vibration due to the long, unsupported lengths of the drive rods 200, 201 passing through that region. The presence of the flow shrouds 60, 61, while necessary for this purpose, introduces a problem with regard to the coolant flow from the head region during blowdown. Particularly, in the event of a loss of coolant accident (LOCA), the entirety of the coolant in the interior of the head assembly 12a, i.e., the head region, must be available to pass through the downcomer flow paths and reach the nuclear core of fuel rod assemblies 20 within the lower barrel assembly 16, for cooling same. As before noted, the downcomer flow paths 210 and 211 are defined by the spacing annuli between the respective drive rods 200, 201 and, variously, the associated flow shrouds 60, 61, the calandria tubes 56, 57 and their associated connecting structures, and thence through the inner barrel assembly 24 and the apertures 19a of the upper core plate 19 into the core region, comprising the fuel assemblies 20 of the lower barrel assembly 16. In this regard, it will be understood that the flow shrouds 60, 61, while received within the flared ends 62a, 63a of the head extensions 62, 63, are not sealed thereto.

However, since the flow shrouds 60, 61 necessarily have solid cylindrical sidewalls, once the head region drains to the tops of the flow shrouds 60, 61 during blowdown, the remaining coolant is trapped in the head region and can no longer enter the downcomer flow path and drain into the core. The present invention affords a solution to this problem, by providing flow holes 221 at the base of each flow shroud 61, extending radially through the sidewalls of the connectors 163, which thus permit substantially the entire volume of coolant within the head region to enter each annular downcomer flow path 211. While illustrated as employed only with the WDRC related flow shrouds 61, if a larger flow is required, corresponding flow holes and related structure, to be described, may be employed as the connectors 162 for the RCC-related flow shrouds 60 and calandria tubes 56, as well.

The provision of the flow holes 221, requires that the drive rods 201 be shielded from the jetting effect of the coolant entering through the flow holes 221 and impinging thereon; further, it is important to guard against the potential of flashing of steam which could block the flow of coolant through the flow holes 221. Particularly, as is well known in the art, steam may become trapped within the head region of the head assembly 12a, for example as a result of a LOCA. During blowdown, when the liquid coolant level within the head region drops below the tops of the flow shrouds 61, steam could enter the annular flow paths 211 in the so-called "flashing" phenomenon and thus block the flow of further liquid coolant through the flow holes 221.

The present invention prevents these problems from occurring, through the provision of a flow diverter 222 which is positioned coaxially within each connector 163 and which comprises an annular flange 223 received on and welded to an annular ledge 163c and an integral, tubular extension 224 having a smaller outer diameter than the inner diameter of the connector 163 and thus defining an annular downcomer flow path 211a through which the coolant entering the flow holes 221 passes, for joining or merging with the blowdown flow through the general, annular downcomer flow path 211.

The flow diverter 222 furthermore includes a flow restrictor 225 which preferably is formed integrally as a radially inward collar within the diverter 222, having an inner surface spaced closely from the outer surface of the drive rod 201. In one practical application, employing a drive rod of approximately 1.75", the inside diameter of the annular flow restrictor 225 is approximately 2.00" and the axial length is approximately 1.25". The flow restrictor 225 thus provides sufficient flow resistance to flashing of steam entering through the open top of the flow shroud 61, such that the steam does not choke off the flow of coolant through the flow holes 221. In fact, in view of the required presence of the flow restrictors 225 to preclude clogging of the downcomer flow due to flashing, substantially all of the downcomer flow from the head region passes through the flow holes 221, even during normal operation. The flow diverter 222 and the associated, integral flow restrictor 225 combine to provide a structure whereby the drive rods 210 are shielded completely from crossflow of coolant within the head region, and in fact are so protected, extending from the head region and throughout the lengths thereof to the tops of the rod guides, without impairment of the head cooling flow to the core during blowdown.

The improved calandria assembly of the present invention thus affords sufficient structural strength and rigidity to provide requisite support functions, including shielding of the drive rods from flow-induced vibrational forces, while additionally providing coolant downcomer flow paths through the annuli between the RCC drive rods and the associated flow shrouds and calandria tubes, which remain functional during blowdown operation, but which do not expose the drive rods to axially directed coolant jetting and which prevents potential blockage of the downcomer flow paths by flashing of steam, as may accompany a LOCA. From the clear teaching herein of the preferred calandria assembly embodiment having specific structures for achieving these requisite functions, numerous modifications and adaptations will be apparent to those of skill in the art and thus it is intended by the appended claims to cover all such modifications and adaptations which fall within the true spirit and scope of the invention.

We claim as our invention:

1. An assembly for use in a pressure vessel of generally vertically oriented, cylindrical configuration having at lease one fluid outlet at a predetermined elevation and a fluid inlet, and which accommodates liquid therein under pressure and defines an axially upward direction of liquid flow throughout a portion of the height of the vessel, parallel to the vessel axis, and a radial direction of liquid flow at the predetermined elevation through each fluid outlet thereof, the assembly, as mounted within said vessel at the predetermined elevation, receiving the liquid flow in the axial direction and turning same to the radial direction and comprising:

first and second parallel plates having corresponding, generally circular perimeters, said first plate being of substantially greater thickness than the thickness of said second plate and affording the main structural support for said assembly within said vessel;

a flanged, cylindrical shell joined at its bottom edge to said first plate and at the flange thereof to said vessel for supporting said assembly at the predetermined elevation within said vessel;

a skirt of generally cylindrical configuration, substantially rigid in the axial direction and joined at its opposite, open ends to the perimeters of the respective first and second plates and having an opening aligned with each said fluid outlet;

plural, axially aligned pairs of first and second mounting holes in said respective first and second plates;

plural first hollow tubes disposed in parallel axial relationship within said assembly, each having upper and lower ends disposed contiguous a corresponding pair of aligned, first and second mounting holes of said first and second plates;

plural first connecting means and plural second connecting means respectively received in said plural first and second mounting holes of said first and second plates and connecting the corresponding upper and lower ends of said plural tubes to said first and second plates in sealed relationship therewith;

said second plate having a plurality of flow holes therein symmetrically disposed about each of said first mounting holes and receiving therethrough the liquid flow within said vessel;

said first plate, with said plural first hollow tubes connected at the upper ends thereof to said corresponding first mounting holes by said respective, plural first connecting means, being impervious to the axial liquid flow received within said assembly; and each of said plural second connecting means comprises an annular portion of said second plate, coaxial with the associated mounting hole and uniformly contoured in a radially inward direction to be of decreasing thickness, relative to the thickness of said second plate, and defining the interior sidewall of the mounting hole, and an annular weld joint joining the interior sidewall of the mounting hole to the lower end of the associated hollow tube, for affording axially flexible connections of the lower ends of said first hollow tubes to said second plate for limiting thermal stresses to an acceptable level while providing relatively rigid lateral support for said hollow tubes.

2. An assembly as recited in claim 1, wherein:
each said annular portion is of J-shaped cross-section; and
each said annular weld joint is a full penetration weld.

3. An assembly as recited in claim 1, wherein each of said first connecting means further comprises:
a generally cylindrical, hollow connector having an annular collar of an outer diameter corresponding to the inner diameter of the corresponding said first mounting hole in said first plate; and
a full penetration weld formed between the sidewall of said first mounting hole of said first plate and said annular collar of the corresponding connector.

4. An assembly as recited in claim 1, further comprising:
plural second hollow tubes, each having upper and lower ends, respectively corresponding to and aligned with said plural first hollow tubes and connected at the lower ends thereof to the respectively corresponding first connecting means and extending in parallel axial relationship above the first plate, the second ends thereof being in open communication with the interior of the head assembly;
each of said aligned first and second hollow tubes and associated first and second connecting means being adapted to receive a corresponding elongated rod in sliding, coaxial relationship therewithin and defining an annular downcomer flow path between the interior surface thereof and the exterior surface of the rod received therein;
at least selected ones of said first connecting means comprising hollow cylindrical connectors received in said first mounting holes of said first plate and having a portion thereof extending axially above said first plate and into said head assembly interior, and having flow holes extending through the sidewalls of said portions within said head assembly interior; and
generally cylindrical diverter means mounted coaxially within each of said selected, first connecting means and positioned to surround a corresponding drive rod received therein, for shielding the drive rod from jetting of liquid through the flow holes.

5. An assembly as recited in claim 4, wherein:
each of said diverter means comprises an annular flange and an integrally connected tubular extension;
each of said first connecting means has an interior, annular ledge therewithin for receiving and having secured thereto the corresponding annular flange of the associated diverter; and
said annular tubular extension of said diverter means extends coaxially within the associated first connecting means in juxtaposed relationship with and beyond said flow holes.

6. An assembly as recited in claim 5 wherein steam develops in the head assembly interior, displacing liquid therefrom, and wherein:
each said diverter means further comprises a flow restrictor for restricting flashing of steam through the annular downcomer flow path.

7. An assembly as recited in claim 6, wherein said flow restrictor comprises an annular collar of a smaller interior diameter relative to that of said tubular extension so as to be disposed closely adjacent the exterior diameter surface of a rod received therein and provide a restricted annular flow passage therebetween which extends for a predetermined axial distance above said flow holes.

8. A pressure vessel for a nuclear reactor system, of generally vertically oriented, cylindrical configuration comprising:

lower and inner barrel assemblies, a calandria assembly, and a head assembly defining a head region therein, at successive, higher elevations within the vessel;

a coolant inlet for introducing coolant into the vessel;

at least one radially disposed coolant outlet nozzle, disposed at a predetermined elevation;

said vessel defining an axial, upward direction of coolant flow throughout a portion of the height of the vessel, parallel to the vessel axis, from said lower barrel assembly to said calandria assembly;

said calandria assembly being mounted within said vessel at the predetermined elevation for receiving the coolant flow in the axial, upward direction and turning same to a radial direction to exit through each said outlet nozzle and comprising:

parallel, upper and lower calandria plates having corresponding, generally circular perimeters, said upper calandria plate being of substantially greater thickness than the thickness of said lower calandria plate and affording the main structural support for said calandria assembly within said vessel, a flanged, cylindrical shell joined at its bottom edge to said upper calandria plate and at the flange thereof to said vessel for supporting said calandria assembly at the predetermined elevation within said vessel, a skirt of generally cylindrical configuration, substantially rigid in the axial direction and joined at its opposite, open ends to the perimeters of the respective upper and lower calandria plates and having an opening aligned with each said fluid outlet, plural, axially aligned pairs of first and second mounting holes in said respective upper and lower calandria plates, plural, hollow calandria tubes disposed in parallel axial relationship within said calandria assembly, each having upper and lower ends disposed contiguous a corresponding pair of aligned, first and second mounting holes of said upper and lower calandria plates, plural first connecting means and plural second connecting means respectively received in said plural first and second mounting holes of said upper and lower calandria plates and connecting the corresponding upper and lower ends of said plural tubes to said upper and lower calandria plates in sealed relationship therewith, said lower calandria plate having a plural flow holes therein symmetrically disposed about each of said first mounting holes and receiving therethrough the coolant flow within said vessel, said upper calandria plate, with said plural hollow calandria tubes connected at the upper ends thereof to said corresponding first mounting holes by said respective first plural connecting means, being impervious to the liquid flow received within said calandria assembly, and each of said plural second connecting means comprises an annular portion of said second plate, coaxial with the associated mounting hole and uniformly contoured in a radially inward direction to be of decreasing thickness, relative to the thickness of said second plate, and defining the interior sidewall of the mounting hole, and an annular weld joint joining the interior sidewall of the mounting hole to the lower end of the associated hollow tube, and said lower calandria plate affording flexible connections of the lower ends of said hollow calandria tubes to said second plate for limiting thermal stresses to an acceptable level while providing relatively rigid lateral support for said hollow calandria tubes.

9. An assembly as recited in claim 8, wherein:

each said annular portion is of J-shaped cross-section; and each said annular weld joint is a full penetration weld.

10. A vessel as recited in claim 8, wherein each of said first connecting means further comprises:

a generally cylindrical, hollow connector having an annular collar of an outer diameter corresponding to the inner diameter of the corresponding first mounting hole in said upper calandria plate; and a full penetration weld formed between the sidewall of said first mounting hole of said upper calandria plate and said annular collar of the corresponding connector.

11. A vessel as recited in claim 8, further comprising:

plural flow shrouds, each having upper and lower ends, respectively corresponding to and aligned with said calandria tubes and connected at the lower ends thereof to the respectively corresponding first connecting means and extending in parallel axial relationship above the upper calandria plate, the second ends thereof being in open communication with the interior of the head assembly;

each of said aligned calandria tube, flow shroud, and associated first and second connecting means being adapted to receive a corresponding elongated rod in sliding, coaxial relationship therewithin and defining an annular downcomer flow path between the interior surface thereof and the exterior surface of the rod received therein;

at least selected ones of said first connecting means comprising hollow cylindrical connectors received in said first mounting holes of said upper calandria plate and having a portion thereof extending axially above said upper calandria plate and into said head assembly interior, and having flow holes extending through the sidewalls of said portions within said head assembly interior; and generally cylindrical diverter means mounted coaxially within each of said selected, first connecting means and positioned to surround a corresponding drive rod received therein, for shielding the drive rod from jetting of liquid through the flow holes.

12. A vessel as recited in claim 11 wherein:

each of said diverter means comprises an annular flange and an integrally connected tubular extension;

each of said first connecting means has an interior, annular ledge therewithin for receiving and having secured thereto the corresponding annular flange of the associated diverter; and said annular tubular extension of said diverter means extends coaxially within the associated first connecting means in juxtaposed relationship with and beyond said flow holes.

13. A vessel as recited in claim 12, wherein steam develops in the head assembly interior, displacing liquid therefrom, and wherein:
    each said diverter means further comprises a flow restrictor for restricting flashing of steam through the annular downcomer flow path.

14. A vessel as recited in claim 12, wherein said flow restrictor comprises an annular collar of a smaller interior diameter relative to that of said tubular extension so as to be disposed closely adjacent the exterior diameter surface of a rod received therein and provide a restricted annular flow passage therebetween which extends for a predetermined axial distance above said flow holes.

* * * * *